UNITED STATES PATENT OFFICE.

S. CADY MURRAY, OF LOCKPORT, NEW YORK.

ADHESIVE CEMENT.

SPECIFICATION forming part of Letters Patent No. 257,601, dated May 9, 1882.

Application filed March 27, 1882. (No specimens.)

*To all whom it may concern:*

Be it known that I, S. CADY MURRAY, a citizen of the United States of America, residing at the city of Lockport, in the county of Niagara and State of New York, have invented certain new and useful Improvements in Cement to be applied to the surface of wood, brick, stone, or other building material for the purpose of rendering such material impervious to water and the atmosphere; and I do hereby declare the following to be a full, clear, and exact description of the invention, such as will enable others skilled in the art to which it appertains to make and use the same.

My composition consists of the following ingredients, combined in the proportions stated, viz: flour of lime-rock, (unburned,) four quarts; water-washed sand, (dry,) four quarts; Portland cement, one quart; dry white French zinc, three quarts; boiled linseed-oil, one quart.

In preparing my composition the above-named ingredients, except the linseed-oil, should be thoroughly mixed together, and then mix with the oil to make a stiff mortar and work it thoroughly.

In using this composition upon wood surfaces the surface should receive a coating of boiled linseed-oil immediately before the application of the compound. The compound should then be applied with a suitable trowel, and be exposed to the air for, say, two or three days, or until it has become hardened, when it will be found to be impervious to water.

By the use of the above-described composition upon any article or structure manufactured from wood the air is entirely excluded, rendering the wood more durable and adding strength.

Having thus described my invention, I claim as new and desire to secure by Letters Patent—

The hereinbefore-described composition of matter or cement to be used and applied to the surface of wood, brick, stone, glass, or any metallic surface, for the purpose of resisting the passage of water and the action of the atmosphere upon such substance, consisting of the flour of lime-rock, water-washed sand, Portland cement, dry white French zinc, and boiled linseed-oil, in the proportions specified.

In testimony whereof I affix my signature in presence of two witnesses.

S. CADY MURRAY.

Witnesses:
C. H. SQUIRES,
F. C. GILLIS.